United States Patent
Kovalev et al.

(10) Patent No.: US 6,482,334 B2
(45) Date of Patent: Nov. 19, 2002

(54) METHODS FOR PREPARING NON-CORROSIVE, ELECTROACTIVE, CONDUCTIVE ORGANIC POLYMERS

(75) Inventors: Igor P. Kovalev, Wilmington, DE (US); Dawn M. Sloane, Tucson, AZ (US); Boris A. Trofimov, Irkutsk (RU)

(73) Assignee: Moltech Corporation, Tucson, AZ (US)

( * ) Notice: Subject to any disclaimer, the term of this patent is extended or adjusted under 35 U.S.C. 154(b) by 83 days.

(21) Appl. No.: 09/803,246

(22) Filed: Mar. 9, 2001

(65) Prior Publication Data

US 2001/0052591 A1 Dec. 20, 2001

Related U.S. Application Data

(60) Provisional application No. 60/188,327, filed on Mar. 9, 2000.

(51) Int. Cl.$^7$ .................................................. H01B 1/12
(52) U.S. Cl. ...................................................... 252/500
(58) Field of Search ........................ 252/500; 528/210, 528/212, 373, 422

(56) References Cited

U.S. PATENT DOCUMENTS

| | | |
|---|---|---|
| 3,532,543 A | 10/1970 | Nole et al. |
| 3,953,231 A | 4/1976 | Farrington et al. |
| 4,469,761 A | 9/1984 | Bennett et al. |
| 4,664,991 A | 5/1987 | Perichaud et al. |
| 5,460,905 A | 10/1995 | Skotheim |
| 5,462,566 A | 10/1995 | Skothiem |
| 5,518,839 A | 5/1996 | Olsen |
| 5,529,860 A | 6/1996 | Skotheim et al. |
| 5,601,947 A | 2/1997 | Skotheim et al. |
| 5,690,702 A | 11/1997 | Skotheim et al. |
| 6,117,590 A | 9/2000 | Skotheim et al. |
| 6,203,727 B1 * | 3/2001 | Babinec et al. ............. 252/500 |

FOREIGN PATENT DOCUMENTS

| | | |
|---|---|---|
| WO | WO 00/67339 | 11/2000 |
| WO | WO 00/67340 | 11/2000 |

OTHER PUBLICATIONS

Yan et al "Liquid polysulfide rubber as a new dopant of polypyrrole", Synthetic Metals 107 (1999) 35–38.*
Rauh et al., "A Lithium/Dissolved Sulfur Battery with an Organic Electrolyte", *J. Electrochem. Soc.*, vol. 126, No. 4, pp. 523–527 (1979).
Yamin et al., "Lithium Sulfur Battery", *J. Electrochem. Soc.*, vol. 135, No. 5, pp. 1045–1048 (1988).
Peled et al., "Rechargeable Lithium–Sulfur Battery (Extended Abstract)", *J. Power Sources.*, vol. 26, pp. 269–271 (1989).
Novak et al., "Electrochemically Active Polymers for Rechargeable Batteries", *Chem. Rev.*, vol. 97, No. 1, pp. 207–281 (1997).
Behl et al., "Stability of Aluminum Substrates in Lithium–Ion Battery Electrolytes", *J. Power Sources*, vol. 72, pp. 132–135 (1998).
Braithwaite et al., "Corrosion of Lithium–Ion Battery Current Collectors", *J. Electrochem. Soc.*, vol. 146, No. 2, pp. 448–456 (1999).

* cited by examiner

*Primary Examiner*—Mark Kopec
(74) *Attorney, Agent, or Firm*—Jacqueline M. Nicol

(57) ABSTRACT

Provided are methods for preparing non-corrosive, electroactive, conductive organic polymers, such as for use in electrochemical cells, wherein the non-corrosive polymers are formed by treatment of electroactive, conductive organic polymer compositions, comprising corrosive anions, with sulfide anions. Also provided are non-corrosive conductive organic polymers prepared by such methods, composite cathodes comprising such polymers, electrochemical cells comprising such cathodes, and methods of preparing such composite cathodes and cells.

12 Claims, No Drawings

METHODS FOR PREPARING NON-CORROSIVE, ELECTROACTIVE, CONDUCTIVE ORGANIC POLYMERS

RELATED APPLICATION

This application claims priority to U.S. Provisional Patent Application Ser. No. 60/188,327, filed Mar. 9, 2000, the disclosure of which is incorporated herein by reference for all purposes.

TECHNICAL FIELD

The present invention pertains generally to the fields of conductive organic polymers and electroactive cathode materials for electrochemical cells. More particularly, the present invention pertains to methods of preparing non-corrosive, electroactive, conductive organic polymers, wherein the non-corrosive polymers are formed by treatment of electroactive, conductive organic polymers, comprising corrosive anions, with sulfide anions and to the polymers prepared by such methods. The present invention also pertains to composite cathodes comprising such polymers, electrochemical cells comprising such cathodes, and to methods of making such composite cathodes and cells.

BACKGROUND

Throughout this application, various publications, patents, and published patent applications are referred to by an identifying citation. The disclosures of the publications, patents, and published patent specifications referenced in this application are hereby incorporated by reference into the present disclosure to more fully describe the state of the art to which this invention pertains.

As the evolution of batteries continues, and particularly as lithium batteries become more widely accepted for a variety of uses, the need for safe, long lasting high energy batteries becomes more important. There has been considerable interest in recent years in developing high energy density cathode-active materials for use in high energy primary and secondary batteries with alkali-metal anode materials. Various types of cathode materials for the manufacture of thin film alkali-metal batteries are known in the art. Of considerable interest are cathode materials comprising sulfur-sulfur bonds, wherein high energy capacity and rechargeability are achieved by the electrochemical cleavage (via reduction) and reformation (via oxidation) of these bonds. For example, in combination with a lithium anode, elemental sulfur has a specific capacity of 1680 mAh/g, and sulfur-containing polymers with trisulfide and longer polysulfide groups in the polymers have shown specific capacities of more than 800 mAh/g. Examples of sulfur containing cathode materials disclosed for use in lithium and sodium batteries include, for example, elemental sulfur, organo-sulfur, and carbon-sulfur polymer compositions.

Elemental sulfur is an attractive cathode material in alkali-metal batteries owing to its low equivalent weight, low cost, and low toxicity. Many alkali-metal/sulfur battery cells have been described, as for example, in U.S. Pat. No. 3,532,543 to Nole et al., U.S. Pat. No. 3,953,231 to Farrington, and U.S. Pat. No. 4,469,761 to Bennett; Rauh et al., *J. Electrochem. Soc.*, 1979, 126, 523–527; Yamin et al., *J. Electrochem. Soc.*, 1988, 135, 1045–1048; and Peled et al., *J. Power Sources*, 1989, 26, 269–271. However, problems with alkali metal/elemental sulfur battery cells have been reported. One problem is that alkali-metal sulfides once reoxidized on cell charge may lead to the formation of an insulating layer on the positive electrode surface which electrochemically and ionically isolates it from the electroactive elements in the cell, resulting in poor cell reversibility and loss of capacity. The electrically and ionically non-conductive properties of sulfur are an obstacle to overcome in cells comprising elemental sulfur.

Attempts have been made to improve the electrochemical accessibility of elemental sulfur by complexing at least one polysulfurated chain with one dimensional electron conducting polymers as described in U.S. Pat. No. 4,664,991 to Perichaud et al.

Electroactive, conjugated polymers have been suggested as additives or components for electrochemical cells, capacitors, and other devices, such as electroluminescent displays, sensors, photovoltaic cells and the like. U.S. Pat. Nos. 5,460,905 and 5,462,566, to Skotheim describe an electrochemical cell which contains a composite cathode comprising carbon-sulfur compounds in combination with a conjugated polymer. U.S. Pat. Nos. 5,529,860, 5,601,947, 5,690,702, and 6,117,590 to Skotheim et al. describe sulfur-containing organic polymer materials which undergo oxidation and reduction with the formation and breaking, respectively, of many sulfur-sulfur bonds which are attached to conjugated structures. The conjugated polymer structures provide good electron transport and fast electrochemical kinetics at ambient temperatures and below. Novak et al. in *Chem. Rev.*, 1997, 97, 207–281, review electroactive conductive polymers, including polymers comprising sulfur, for electrochemical cells.

In the preparation of electroactive, conductive organic polymers, a variety of oxidants and other reagents are used. For example, oxidants such as inorganic ferric salts and alkali metal persulfates, dichromates, periodates, and permanganates, are used as polymerization initiators. In addition, mineral acids such as HCl and $H_2SO_4$ and other reagents are used in conjunction with the oxidants. Residual amounts of these oxidants or reagents or by-products of these materials formed in the polymerization process may remain in the electroactive, conductive organic polymers isolated.

In the fabrication of electrochemical cells, one problem encountered is that of corrosion of the current collectors by cell components, for example, by the electrolyte, by reduction or oxidation products of the electrodes, or by impurities or process residuals present in cell components, such as cathode materials. For example, Braithwaite et al., in *J. Electrochem. Soc.*, 1999, 146, 448–456, describe, in lithium ion batteries, degradation of aluminum current collectors by pitting corrosion and degradation of copper current collectors by corrosion cracking. Another example of aluminum current collector corrosion is described by Behl et al., in *J. Power Sources*, 1998, 72, 132–135.

One approach to reduce the corrosion of aluminum current collectors is described in U.S. Pat. No. 5,518,839, to Olsen, in which a layer of corrosion resistant metal, such as nickel, copper, chromium, titanium, or mixtures thereof, is applied to an etched aluminum current collector surface. Such an approach, however, adds an additional process step and adds weight and cost to the cell.

It is therefore an object of the present invention to provide electroactive, conductive organic polymer materials and composite cathodes which show reduced corrosion of current collectors.

It is a further object of the present invention to provide methods for making electroactive, conductive organic polymer materials and composite cathodes which show reduced corrosion of current collectors.

SUMMARY OF THE INVENTION

The present invention pertains to a method for preparing an electroactive, conductive organic polymer in its oxidized state, wherein the electroactive, conductive organic polymer comprises a positively charged polymer and one or more sulfide anions. The electroactive, conductive organic polymer in its oxidized state, prepared by the methods of the present invention, comprises (i) a positively charged polymer selected from the group consisting of positively charged polypyrroles, positively charged polyanilines, positively charged polythiophenes, positively charged $[M''(S_m)^{x-}{}_n]_y$ polymers, and positively charged $[M']_p[\{M''(S_m)^{x-}{}_n\}_y]_z$ polymers, and (ii) one or more sulfide anions; wherein: M' is a non-conductive repeating unit of the polymer and is the same or different at each occurrence; M'' is a conductive repeating unit of the polymer and is the same or different at each occurrence; n is an integer from 0 to 3 and is the same or different at each occurrence, with the proviso that the number of $(S_m)^{x-}$ moieties in the positively charged polymer is equal to or greater than 1; y is an integer from 8 to 1000; m is an integer from 3 to 200 and is the same or different at each occurrence; x is an integer from 0 to 2 and is the same or different at each occurrence; p is an integer from 2 to 20,000; and z is an integer from 1 to 100, where z is less than or equal to p. In one embodiment of the methods of preparing an electroactive, conductive organic polymer in its oxidized state of the present invention, the method comprises the steps of: (a) providing a dispersion of a positively charged polymer and an anion other than a sulfide anion, in a liquid medium comprising water; (b) treating the dispersion of step (a) with a solution comprising water and a sulfide anion, thereby forming a dispersion of the electroactive, conductive organic polymer in a liquid medium; (c) separating the electroactive, conductive organic polymer of step (b) from the liquid medium of step (b); and (d) drying the polymer separated in step (c) to remove residual amounts of the liquid medium of step (b) to form the electroactive, conductive organic polymer.

In one embodiment, subsequent to step (c) and prior to step (d), there are one or more steps of washing the polymer separated in step (c) with a solution comprising water.

In one embodiment, the electroactive, conductive organic polymer is non-corrosive in contact with a metal current collector, wherein the current collector comprises aluminum.

In one embodiment, the sulfide anions of step (b) comprise sulfide anions, $S_u{}^{2-}$, where u is an integer from 1 to 6 and is the same or different at each occurrence.

In one embodiment, the solution of step (b) comprises an alkali metal sulfide, $M_2S_u$, wherein M is an alkali metal selected from the group consisting of Li, Na, or K, and u is an integer from 1 to 6 and is the same or different at each occurrence. In one embodiment, the alkali metal sulfide comprises sodium sulfide, $Na_2S$. In one embodiment, the solution of step (b) comprises an ammonium sulfide, $(NH_4)_2S_u$, where u is an integer from 1 to 6 and is the same or different at each occurrence.

In one embodiment, in step (a), the anion other than a sulfide anion comprises chloride ions. In one embodiment, in step (a), the anion other than a sulfide anion, is a chloride ion.

In one embodiment, M'' is selected from the group consisting of pyrrole, aniline, indole, phenylene diamines, thiophene, acetylene, phenylene, vinyl phenylene, vinyl thienylene; and their substituted derivatives.

In one embodiment, M' is selected from the group consisting of vinyl imidazole, aminostyrene, vinyl oxazoline, dimethylaminopropyl methacrylamide, diethylaminoethyl methacrylate, vinyl pyridine, acrylamide, diacetone acrylamide, vinylpyrrolidone, diallyldimethyl ammonium salts, methacryloyloxyethyl trimethyl ammonium salts, methacrylamidopropyl trimethyl ammonium salts, vinyl benzyl trimethylammonium salts, and vinyl-1-methyl-pyridinium salts.

In one embodiment, the positively charged polymer of step (a) is $[M''(S_m)^{x-}{}_n]_y$.

In one embodiment, the positively charged polymer of step (a) is $[M']_p[\{M''(S_m)^{x-}{}_n\}_y]_z$.

A further aspect of the present invention pertains to an electroactive, conductive organic polymer prepared by the method described herein.

Another aspect of the present invention pertains to composite cathodes comprising the electroactive, conductive organic polymers of this invention for use in electrochemical cells. In one embodiment, the composite cathode comprises (a) an electroactive, conductive organic polymer, as described herein; and (b) one or more conductive fillers selected from the group consisting of conductive carbons, graphites, activated carbon fibers, carbon nanofibers, metal flakes, metal powders, metal fibers, carbon fabrics, metal mesh, electrically conductive polymers, and electrically conductive metal chalcogenides. In one embodiment, cathode further comprises one or more materials selected from the group consisting of binders, electrolytes, non-electroactive metal oxides, and electroactive transition metal chalcogenides. In one embodiment, the conductive organic polymer of the cathode is non-corrosive in contact with a metal current collector, wherein said current collector comprises aluminum.

Another aspect of the present invention pertains to a method of preparing a composite cathode comprising the electroactive, conductive organic polymers of the present invention, as described herein, which method comprises the steps of: (a) dispersing or suspending in a liquid medium the electroactive, conductive organic polymer; (b) optionally adding to the mixture of step (a) a conductive filler; (c) mixing the composition resulting from step (b) to disperse said electroactive polymer; (d) casting the composition resulting from step (c) onto a substrate; and, (e) removing some or all of the liquid from the composition resulting from step (d) to provide the composite cathode.

In one embodiment, the method further comprises the addition to any or all of the steps (a), (b), or (c) of one or more materials selected from the group consisting of binders, electrolytes, non-electroactive metal oxides, and electroactive transition metal chalcogenides.

Another aspect of the present invention pertains to an electrochemical cell. The cell of this invention comprises an anode, a composite cathode comprising an electroactive, conductive organic polymer of the present invention, as described herein, and an electrolyte interposed between the anode and the cathode. In one embodiment, the anode comprises one or more materials selected from the group consisting of lithium metal, lithium-aluminum alloys, lithium-tin alloys, lithium-intercalated carbons, and lithium-intercalated graphites. In one embodiment, the electrolyte is an organic electrolyte comprising one or more materials selected from the group consisting of liquid electrolytes, gel polymer electrolytes, and solid polymer electrolytes.

Another aspect of the present invention pertains to methods of forming an electrochemical cell. The methods comprise the steps of providing an anode, providing a cathode comprising an electroactive, conductive organic polymer of the present invention, as described herein, and interposing an electrolyte between the anode and the cathode.

As will be appreciated by one of skill in the art, features of one aspect or embodiment of the invention are also applicable to other aspects or embodiments of the invention.

DETAILED DESCRIPTION OF THE INVENTION

Methods of Making Non-Corrosive, Electroactive, Conductive Organic Polymers

The present invention generally pertains to methods of preparing electroactive, conductive organic polymers comprising a positively charged polymer and one or more sulfide anions.

One aspect of the present invention pertains to methods for preparing electroactive, conductive organic polymers, wherein the polymer comprises (i) a positively charged polymer selected from the group consisting of positively charged polypyrroles, positively charged polyanilines, positively charged polythiophenes, positively charged $[M''(S_m)^{x-}{}_n]_y$ polymers, and positively charged $[M']_p[\{M''(S_m)^{x-}{}_n\}_y]_z$ polymers and (ii) one or more sulfide anions; wherein the method comprises the steps of:

(a) providing a dispersion of the positively charged polymer and an anion other than a sulfide anion, in a liquid medium comprising water;

(b) treating the dispersion of step (a) with a solution comprising water and sulfide anions, thereby forming a dispersion of the electroactive, conductive organic polymer in a liquid medium;

(c) separating the electroactive, conductive organic polymer of step (b) from the liquid medium of step (b); and (d) drying the polymer separated in step (c) to remove residual amounts of the liquid medium of step (b) to form the electroactive, conductive organic polymer.

In one embodiment, the electroactive, conductive organic polymers prepared by the methods of the present invention are non-corrosive.

The electroactive, conductive organic polymers prepared by the methods of the present invention, comprise sulfide anions. In one embodiment, the sulfide anions comprises sulfide anions, $S_u^{2-}$, where u is an integer from 1 to 10 and is the same or different at each occurrence. Preferably, the sulfide anions, comprise sulfide anions, $S_u^{2-}$, where u is an integer from 1 to 6 and is the same or different at each occurrence. Preferable, the electroactive, conductive organic polymers prepared by the methods of the present invention are in their oxidized state.

The terms "conductive polymer" and "conductive organic polymer", as used herein, refer, respectively, to organic polymers having conjugated π-electron polymeric segments which can be oxidized and reduced reversibly and which have electrically conductive properties in at least one of their oxidation states.

The term "monomer" is used herein to describe moieties that are capable of reacting to form polymers.

The term "repeating unit", as used herein, refers to one or more moieties in a polymer derived from the polymerization of one or more monomers.

The term "polysulfide chain", as used herein, relates to a divalent chemical moiety, —$(S_m)$—, —$(S_m)^-$, or $(S_m)^{2-}$, in its oxidized state, which moiety is bonded covalently, covalently and ionically, or ionically to repeating units of a polymer, where m is equal to or greater than 3. Typically, m of the polysulfide chain is an integer from 3 to 200, and may be the same or different at each occurrence. In one embodiment, m is an integer from 9 to 200 and may be the same or different at each occurrence. In another embodiment, m is an integer from 24 to 100 and may be the same or different at each occurrence.

The term "corrosive," as used herein, pertains to the property of a chemical moiety in which the moiety destructively attacks or corrodes a metal or metal alloy. The term "non-corrosive," as used herein, pertains to the property of a chemical moiety in which the moiety has a low corrosion rate such as, for example, would be acceptable in applications such as electrochemical cells, fuel cells, capacitors including supercapacitors, electrochemical sensors and displays, including bipolar configurations of capacitors.

The method of making non-corrosive, electroactive, conductive organic polymers of the present invention from electroactive, conductive organic polymer compositions, comprising anions other than sulfide anions, is carried out by dispersing the electroactive, conductive organic polymer compositions, comprising anions other than sulfide anions, in a liquid medium and treating the dispersion with sulfide anions. Preferably, the polymer dispersions are treated with sulfide anions for 5 minutes to 12 hours at temperatures from 15° C. to 50° C. Suitable liquid media include, but are not limited to, water; alcohols, such as methanol, ethanol, and isopropanol; esters, and mixtures thereof. Water or aqueous liquids are preferred. Dispersion of the polymers in the liquid medium may be performed by any of the known methods for dispersing solids in liquids, such as mechanical stirring.

In the methods of the present invention, dispersions of the positively charged polymers are treated with sulfide anions. Suitable sulfide anions include, but are not limited to, $S_u^{2-}$, where u is an integer from 1 to 10. Preferred are sulfide anions, $S_u^{2-}$, where u is an integer from 1 to 6. Treatment with sulfide anions present as alkali metal and ammonium sulfides, $M_2S_u$, where M is Li, Na, K, or $NH_4$, and u is the same or different at each occurrence, are preferred. Also preferred are lower sulfides, $M_2S_u$, where u is an integer from 1 to 6 and is the same or different at each occurrence. Examples of suitable alkali metal sulfides for the treatment of the polymer dispersions of the present invention include, but are not limited to, $Na_2S$, $Na_2S_2$, $Na_2S_3$, $Na_2S_4$, $Li_2S$, $Li_2S_2$, $Li_2S_3$, $Li_2S_4$, and mixtures thereof. The sulfide anions are preferably added to the polymer dispersion in aqueous solution.

The amount of sulfide anion used in the methods of the present invention may vary widely, but preferably the sulfide anion is used in a molar amount greater than that of the corrosive anion or other anion moiety in the electroactive, conductive polymer. Typically a molar amount of the sulfide anion used is from 2 to 5 times the molar amount of the corrosive or other anion moiety. Although one treatment of the suspension of a corrosive polymer with sulfide anions in the methods of this invention will reduce the corrosivity, it may be desirable to perform more than one treatment. After treatment of the corrosive polymer with the sulfide anion, the non-corrosive, electroactive, conductive organic polymers may be separated from the liquid medium by known methods for the separation of solids from liquids, such as by filtration, centrifugation, or simply decantation. After separation, the non-corrosive, electroactive, conductive organic polymers may be dried. It may be desirable to wash the separated polymer one or more times prior to the drying step. Suitable liquids for the washing step include, but are not limited to, water; alcohols, such as methanol, ethanol, and isopropanol; esters, and mixtures thereof.

In the preparation of electroactive, conductive organic polymers, a variety of oxidants and other reagents are used.

For example, oxidants such as $FeCl_3$, $Fe(NO_3)_3$, $CuCl_2$, $H_2O_2$, $(NH_4)_2S_2O_8$, $Na_2S_2O_8$, $KIO_3$, $I_2$, $KMnO_4$, $(NH_4)_2Cr_2O_7$, and $K_2Cr_2O_7$ are used as polymerization initiators. In addition, mineral acids such as HCl and $H_2SO_4$ and other reagents are used in conjunction with the oxidants. Residual amounts of these oxidants or reagents or by-products of these materials formed in the polymerization process may remain in the electroactive, conductive organic polymers isolated. For example, chloride ions, nitrate ions or sulfate ions may remain in the conductive polymer. These residual species may cause the electroactive, conductive organic polymers to be corrosive. For example, chloride ions are corrosive to aluminum, such as used in current collectors of electrochemical cells and other devices such as capacitors including supercapacitors, and the like. The term "electrochemical cell," as used herein, refers to devices including, but not limited to, batteries, capacitors including supercapacitors, photovoltaic cells, and electrochemical sensors and displays, where electroactive conductive organic polymers are used.

Suitable electroactive, conductive organic polymer compositions, comprising anions other than sulfide anions, to which the methods of the present invention may be applied, include, but are not limited to, those selected from the group consisting of positively charged polypyrroles, positively charged polyanilines, positively charged polythiophenes, positively charged $[M''(S_m)^{x-}{}_n]_y$ polymers, as described in U.S. Provisional Patent Application No. 60/132,348, filed May 4, 1999, both of the common assignee, and which are incorporated herein by reference in their entirely for all purposes, and U.S. patent application Ser. No. 09/565,187, filed May 3, 2000, and positively charged $[M']_p[\{M''(S_m)^{x-}{}_n\}_y]_z$ polymers, as described in U.S. Provisional Patent Application No. 60/132,393, filed May 4, 1999, and U.S. patent application Ser. No. 09/565,184, filed May 3, 2000, both of the common assignee, and which are incorporated herein by reference in their entirely for all purposes; wherein:

M' is a non-conductive repeating unit and is the same or different at each occurrence;

M" is a conductive repeating unit and is the same or different at each occurrence;

n is an integer from 0 to 3 and is the same or different at each occurrence, with the proviso that the number of $(S^m)^{x-}$ moieties in the polymer is equal to or greater than 1;

y is an integer from 8 to 1000;

m is an integer from 3 to 200 and is the same or different at each occurrence;

x is an integer from 0 to 2 and is the same or different at each occurrence;

p is an integer from 2 to 20,000; and, z is an integer from 1 to 100, where z is less than or equal to p.

In one embodiment, the conductive repeating unit, M", is selected from the group consisting of pyrrole, aniline, indole, phenylene diamines, thiophene, acetylene, phenylene, vinyl phenylene, vinyl thienylene; and their substituted derivatives. Suitable derivatives include, but are not limited to, alkyl derivatives, amine derivatives, and benzo derivatives. Examples of alkyl derivatives include methyl, ethyl, propyl, isopropyl, butyl, pentyl, hexyl, octyl, and decyl, such as N-methyl pyrrole, 3-methyl pyrrole, and 2-methyl aniline.

The non-conductive repeating unit, M', is selected from the group consisting of vinyl imidazole, aminostyrene, vinyl oxazoline, dimethylaminopropyl methacrylamide, diethylaminoethyl methacrylate, vinyl pyridine, acrylamide, diacetone acrylamide, vinylpyrrolidone, diallyldimethyl ammonium salts, methacryloyloxyethyl trimethyl ammonium salts, methacrylamidopropyl trimethyl ammonium salts, vinyl benzyl trimethylammonium salts, and vinyl-1-methylpyridinium salts.

While not wishing to be bound by any theory, it is believed that the sulfide anion treatment reduces the corrosivity of the electroactive, conductive organic polymer compositions, comprising corrosive anions, by exchanging sulfide anions for the non-sulfide, corrosive anions present in these polymers. For example, in electroactive, conductive organic polymers containing chloride anions, the methods of the present invention reduce the concentration of chloride anions which are replaced by sulfide anions to maintain electrical neutrality of the polymer. In like manner, other corrosive anionic species may be exchanged for sulfide anion species.

Cathodes Comprising Non-Corrosive, Electroactive, Conductive Organic Polymers

One embodiment of the present invention pertains to a composite cathode for use in an electrochemical cell, wherein the cathode comprises (a) a non-corrosive, electroactive, conductive organic polymer, as described herein; and (b) one or more conductive fillers selected from the group consisting of conductive carbons, graphites, activated carbon fibers, carbon nanofibers, metal flakes, metal powders, metal fibers, carbon fabrics, metal mesh, electrically conductive polymers, and electrically conductive metal chalcogenides. The methods of this invention may also be used to prepare non-corrosive electrically conductive polymer additives for cathodes.

The cathodes of the present invention may further comprise a current collector or substrate, as described herein. In one embodiment of the cathodes of the present invention comprising the conductive organic polymer, the cathode is non-corrosive in contact with a metal current collector.

Methods of Making Cathodes Comprising Non-Corrosive, Electroactive, Conductive Organic Polymers One aspect of the present invention pertains to methods for fabricating composite cathodes comprising the non-corrosive, electroactive, conductive organic polymers of the present invention.

In one embodiment of the method for preparing a composite cathode of the present invention, the method comprises the steps of: (a) dispersing or suspending in a liquid medium the non-corrosive, electroactive, conductive organic polymer, as described herein; (b) optionally adding to the mixture of step (a) a conductive filler; (c) mixing the composition resulting from step (b) to disperse the electroactive polymer; (d) casting the composition resulting from step (c) onto a suitable substrate; and (e) removing some or all of the liquid from the composition resulting from step (d) to provide a composite cathode.

Examples of suitable substrates for use in the methods of the present invention include, but are not limited to, conductive metal foils and conductive metal layers on an insulating layer. A conductive pigment layer may optionally be interposed between the cathode active layer with the cathode active material and the metal conductive layer on the insulating layer. Suitable conductive pigment layers include, but are not limited to, coatings comprising conductive metal pigments, coatings comprising conductive carbons, coatings comprising conductive graphites, and coatings comprising conductive metal oxide pigments. In one embodiment, the substrate is an aluminum foil. In a preferred embodiment, the conductive metal of the metal collector layer is aluminum, and an insulating layer is present under the aluminum. Examples of suitable insulating layers include, but are not limited to, those selected from the group consisting of plastic films, such as, for example, polyethylene terephthalate films; and polymeric coatings, such as, for example, isocyanate-crosslinked urethane coatings.

Electrochemical Cells and Methods of Making Same

Another aspect of the present invention pertains to electrochemical cells comprising cathodes of the present invention, as described herein, and to methods of forming electrochemical cells, wherein the methods comprise the steps of: (a) providing an anode; (b) providing a composite cathode of the present invention, as described herein; and (c) interposing an electrolyte between the anode and the cathode.

Suitable anode materials for the electrochemical cells of the present invention include, but are not limited to, lithium metal, lithium-aluminum alloys, lithium-tin alloys, lithium-intercalated carbons, and lithium-intercalated graphites.

The electrolytes used in electrochemical cells function as a medium for the storage and transport of ions, and in the special case of solid electrolytes and gel electrolytes, these materials may additionally function as separator materials between the anode and the cathode. Any liquid, solid, or gel material capable of storing and transporting ions may be used, so long as the material is electrochemically and chemically unreactive with respect to the anode and the cathode, and the material facilitates the transport of ions between the anode and the cathode. The electrolyte must also be electronically non-conductive to prevent short circuiting between the anode and the cathode.

Examples of suitable electrolytes for use in the present invention include, but are not limited to, organic electrolytes comprising one or more materials selected from the group consisting of liquid electrolytes, gel polymer electrolytes, and solid polymer electrolytes.

EXAMPLES

Several embodiments of the present invention are described in the following examples, which are offered by way of illustration and not by way of limitation.

Example 1

To 5 L of deionized water stirred in a 22 L flask was added anhydrous $FeCl_3$ (680 g). To this stirred solution was added sulfur (1090 g) through a dry powder funnel followed by ethanol (300 mL). Pyrrole (255.8 g) was added dropwise during 15 minutes at ambient temperature, and the reaction mixture was stirred for an additional 2 hours. Additional deionized water (10 L) was added, and stirring was continued for 2 hours. The resultant black solid was recovered by filtration and washed with deionized water and then with methanol. The solid was washed again with water and then dried under vacuum at room temperature for 18 hours. Analysis of the polymer gave the following results: C, 7.17%; N, 1.93%; S, 87.0%; Cl, 0.82%.

Example 2

The solid polymer of Example 1 (200 g) was dispersed in 1 L of deionized water. To the stirred suspension was added $Na_2S.3H_2O$ (50 g) and stirring was continued for 30 minutes. The solid product was separated by filtration under vacuum and the solids washed with water until the washings were colorless. Additional washing was carried out with acetone, and the resulting solid was dried under vacuum at room temperature for 18 hours. Analysis of the polymer gave the following results: C, 9.39%; N, 2.55%; S, 82.0%; Cl, 0.16%.

Example 3

In a 22 L beaker $FeCl_3$ (460 g) was dissolved in a mixture of water (3.68 L) and methanol (920 mL). To this solution was added sublimed sulfur powder (736.1 g) and the suspension was stirred for 30 minutes. Pyrrole (178.5 mL) was added dropwise from an addition funnel during 30 minutes and the mixture was stirred overnight at room temperature. The resulting black solid was separated by filtration and washed successively with two 5 L portions of water, 5 L of acetone and 5 L of water. The solid, suspended in 3.5 L of water, was then treated with $Na_2S.3H_2O$ (200 g). After stirring for 1 hour, the solid was separated by filtration and washed with water and acetone before drying under vacuum at room temperature overnight. The solid polymer was found to contain 0.19% Cl upon analysis.

Example 4

A cathode formulation was prepared by coating a mixture of 75 parts of the polymer of Example 1, 10 parts of a conductive carbon pigment PRINTEX XE-2 (a trademark for a carbon pigment available from Degussa Corporation, Akron, Ohio), and 15 parts of graphite (available from Fluka, Milwaukee, Wis.) dispersed in isopropanol onto a 17 micron thick conductive carbon coated aluminum foil substrate (Product No. 60303 available from Rexam Graphics, South Hadley, Mass.). After drying and calendering, the coating thickness was about 12 microns and the loading 1.6 $mg/cm^2$. Almost immediately after completing the coating process, approximately two hours, visual examination of the uncoated surface of the aluminum foil substrate showed numerous pits which was clear evidence of corrosion.

Example 5

A cathode formulation was prepared by the procedure of Example 4, except that the polymer of Example 2 was substituted for the polymer of Example 1. A coating was prepared on a conductive carbon coated aluminum foil substrate according to Example 4. Visual examination of the uncoated surface of the aluminum foil substrate after more than one month showed an absence of pits and no evidence of corrosion.

Example 6

$FeCl_3$, (81.2 g, 0.50 mol), was dissolved in 500 mL of water with stirring and allowed to stand for 20 minutes. To the stirred solution, pyrrole, (32.9 g, 0.49 mol), was slowly added at ambient temperature. The solution immediately turned black, and solid began to separate. After stirring for 1 hour, the black solid which had formed was separated by filtration and washed successively with water, 5% HCl, water, and acetone. The black solid, polypyrrole, was dried overnight at 80° C. Analysis of the polypyrrole gave the following results: C, 54.41%; H, 3.81%; N, 16.18%; Cl, 10.76%.

Example 7

The polypyrrole of Example 6, (0.17 g, 2.5 mmol), was added during 2 hours to an aqueous solution of $Na_2S_2$, prepared from elemental sulfur (0.32 g, 10 mmol) and $Na_2S.9H_2O$ (2.4 g, 10 mmol) in 15 mL of water at 70–75°

C. The mixture was stirred at 20–25° C. for 20 hours, the suspended solid filtered, washed successively with water, ethanol, and acetone, and dried in vacuum to yield 0.15 g of polymer. Analysis of the polymer gave the following results: C, 58.12%; H, 3.52%; N, 17.00%; Cl, 1.82%; S, 0.81%.

Example 8

The polypyrrole of Example 6, (0.13 g, 2 mmol), was added during 2 hours to an aqueous solution of $Na_2S_3$, prepared from elemental sulfur (0.64 g, 20 mmol) and $Na_2S.9H_2O$ (2.4 g, 10 mmol) in 15 mL of water at 70–75° C. The mixture was stirred at 100° C. for 20 hours, cooled to room temperature, the suspended solid filtered, washed successively with water, ethanol, and acetone, and dried in vacuum to yield 0.16 g of polymer. Analysis of the polymer gave the following results: C, 38.51%; H, 2.16%; N, 10.38%; Cl, 0.82%; S, 30.33%.

While the invention has been described in detail and with reference to specific embodiments thereof, it will be apparent to one skilled in the art that various changes and modifications can be made without departing from the spirit and scope thereof.

What is claimed is:

1. A method for preparing an electroactive, conductive organic polymer in its oxidized state, wherein said electroactive, conductive polymer comprises (i) a positively charged polymer and (ii) one or more sulfide anions; wherein said method comprises the steps of:
    (a) providing a dispersion of said positively charged polymer and an anion other than a sulfide anion, in a liquid medium comprising water;
    (b) treating the dispersion of step (a) with a solution comprising water and sulfide anions, thereby forming a dispersion of said electroactive, conductive organic polymer in a liquid medium;
    (c) separating said electroactive, conductive organic polymer of step (b) from said liquid medium of step (b); and
    (d) drying the polymer separated in step (c) to remove residual amounts of said liquid medium of step (b) to form said electroactive, conductive organic polymer;
    wherein said positively charged polymer is selected from the group consisting of positively charged polypyrroles, positively charged polyanilines, positively charged polythiophenes, positively charged $[M''(S_m)^{x-}{}_n]_y$ polymers, and positively charged $[M']_p[\{M''(S_m)^{x-}{}_n\}_y]_z$ polymers wherein:
    M' is a non-conductive repeating unit of the polymer and is the same or different at each occurrence;
    M'' is a conductive repeating unit of the polymer and is the same or different at each occurrence;
    n is an integer from 0 to 3 and is the same or different at each occurrence, with the proviso that the number of $(S_m)^{x-}$ moieties in the positively charged polymer is equal to or greater than 1;
    y is an integer from 8 to 1000;
    m is an integer from 3 to 200 and is the same or different at each occurrence;
    x is an integer from 0 to 2 and is the same or different at each occurrence;
    p is an integer from 2 to 20,000; and
    z is an integer from 1 to 100, where z is less than or equal to p.

2. The method of claim 1, wherein, subsequent to step (c) and prior to step (d), there are one or more steps of washing the polymer separated in step (c) with a solution comprising water.

3. The method of claim 1, wherein said electroactive, conductive organic polymer is non-corrosive in contact with a metal current collector, wherein said current collector comprises aluminum.

4. The method of claim 1, wherein said solution of step (b) comprises an alkali metal sulfide, $M_2S_u$, wherein M is an alkali metal selected from the group consisting of Li, Na, and K, and u is an integer from 1 to 6 and is the same or different at each occurrence.

5. The method of claim 4, wherein said alkali metal sulfide comprises sodium sulfide, $Na_2S$.

6. The method of claim 1, wherein said sulfide anions of step (b) comprise sulfide anions, $S_u{}^{2-}$, wherein u is an integer from 1 to 6 and is the same or different at each occurrence.

7. The method of claim 1, wherein said solution of step (b) comprises an ammonium sulfide, $(NH_4)_2S_u$, wherein u is an integer from 1 to 6 and is the same or different at each occurrence.

8. The method of claim 1, wherein, in step (a), said anion other than a sulfide anion comprises a chloride ion.

9. The method of claim 1, wherein M'' is selected from the group consisting of pyrrole, aniline, indole, phenylene diamines, thiophene, acetylene, phenylene, vinyl phenylene, vinyl thienylene; and their substituted derivatives.

10. The method of claim 1, wherein M' is selected from the group consisting of vinyl imidazole, aminostyrene, vinyl oxazoline, dimethylaminopropyl methacrylamide, diethylaminoethyl methacrylate, vinyl pyridine, acrylamide, diacetone acrylamide, vinylpyrrolidone, diallyldimethyl ammonium salts, methacryloyloxyethyl trimethyl ammonium salts, methacrylamidopropyl trimethyl ammonium salts, vinyl benzyl trimethylammonium salts, and vinyl-1-methylpyridinium salts.

11. The method of claim 1, wherein said positively charged polymer of step (a) is a positively charged $[M''(S_m)^{x-}{}_n]_y$ polymer.

12. The method of claim 1, wherein said positively charged polymer of step (a) is a positively charged $[M']_p[\{M''(S_m)^{x-}{}_n\}_y]_z$ polymer.

* * * * *